UNITED STATES PATENT OFFICE

HENRY BROUGHAM HUTCHINSON, OF HARPENDEN, ENGLAND, ASSIGNOR TO THE DISTILLERS COMPANY LIMITED, OF EDINBURGH, SCOTLAND, A BRITISH COMPANY

PRODUCTION OF BUTYL ALCOHOL AND ACETONE BY FERMENTATION

No Drawing. Application filed April 20, 1929, Serial No. 356,882, and in Great Britain June 25, 1928.

This invention relates to the production of butyl alcohol and acetone by fermentation, and has for its chief object to obtain high yields of butyl alcohol or acetone at will relatively to the proportion of ethyl alcohol produced, and furthermore to obtain higher yields of total products obtainable than have been produced hitherto by known methods. More particularly the object is to attain these high yields from materials not usually regarded as suitable for such fermentation such for example as manioc and similar starchy materials naturally poor in nutrient substances (protein).

It has been suggested to increase the normally obtainable yields of one or more of the products of bacterial fermentation of the mashes or liquors usually employed in this art by the addition of volatile fatty acids or their salts. Moreover in my co-pending patent application I have described how the total yields from raw materials usually regarded as too poor in protein may be increased while maintaining the usual proportion between the respective products and I have mentioned ammonium phosphate as capable of producing such increased total yields.

I have now found that by suitable selection of a nitrogenous form of nutrition, it is possible to increase the proportion of acetone or the proportion of butyl alcohol and diminish the yield of ethyl alcohol and that this may be achieved from materials not otherwise suitable for the kind of fermentation in question. Furthermore the total yields of products obtainable by the present invention have been found to be higher than those hitherto obtainable.

I have found that ammonium salts of certain organic acids are particularly suitable for my purpose. As an example of a nutrient which will increase the yield of acetone may be mentioned ammonium acetate, and as an example of a nutrient which will increase the yield of butyl alcohol may be mentioned ammonium lactate. Such nutrients may be added before starting or during fermentation, either at one point or at suitable intervals or continuously.

Two examples may be given although they are not to be considered as limiting the scope of the invention and are given by way of indicating possible methods of working.

Example I

Two portions of mash were prepared from manioc flour and water in the usual way and after being sterilized for two hours at a pressure of 30 lbs. per sq. inch, they were cooled and inoculated with a culture of an appropriate butyl alcohol-acetone organism. When fermentation was proceeding vigorously, i. e. about eight hours after inoculation, one of the portions of mash received an addition of a solution of ammonium acetate and this was continued hourly up to the 18th hour from the time of inoculation. Fermentation was then allowed to proceed for four days, after which time the respective portions of mash were distilled. The yields and composition of the volatile products from the two portions of mash are given in the following table:—

| Yield on | Manioc | Composition of products | | |
|---|---|---|---|---|
| | | Acetone | Ethyl alcohol | Butyl alcohol |
| | Per cent | Per cent | Per cent | Per cent |
| Untreated mash | 15.2 | 26.3 | 8.0 | 65.7 |
| Treated mash | 25.5 | 34.4 | 4.82 | 60.8 |

Example II

A fermentation was carried out in precisely the same manner as outlined above, with the exception that eight hours after inoculation and hourly to the 18th hour additions of a solution of ammonium lactate were made.

Fermentation was again allowed to proceed as before, and the volatile products were determined, and the following results obtained:—

| Yield on | manioc | Composition of products | | |
| --- | --- | --- | --- | --- |
| | | Acetone | Ethyl alcohol | Butyl alcohol |
| Untreated mash | Per cent 14.1 | Per cent 27.3 | Per cent 6.8 | Per cent 65.9 |
| Treated mash | 25.5 | 20.2 | 5.0 | 74.8 |

What I claim is:—

1. In the production of butyl alcohol and acetone, subjecting to butyl alcohol-acetone fermentation a mash of starchy material, and adding thereto an ammonium salt of an organic acid capable of producing an increase above the normal yield of one of said products relatively to the other.

2. In the production of butyl alcohol and acetone by fermentation of starchy materials, the step of adding ammonium lactate to increase the yield of butyl alcohol.

3. In the production of butyl alcohol and acetone by fermentation of starchy materials, the step of adding ammonium acetate to increase the yield of acetone.

4. In the production of butyl alcohol and acetone by fermentation of starchy materials, the step of adding ammonium lactate at intervals during the fermentation to increase the yield of butyl alcohol.

5. In the production of butyl alcohol and acetone by fermentation of starchy materials, the step of adding ammonium acetate at intervals during the fermentation to increase the yield of acetone.

6. In the production of butyl alcohol and acetone, subjecting to butyl-acetone fermentation a mash of starchy material poor in protein, and adding ammonium lactate to supplement the deficiency in nitrogenous nutrient for the fermentation organism and simultaneously to act as promoter to increase the ratio of butyl alcohol to acetone produced.

7. In the production of butyl alcohol and acetone, subjecting to butyl-acetone fermentation a mash of starchy material poor in protein, and adding ammonium acetate to supplement the deficiency of nitrogenous nutrient for the fermentation organism, and simultaneously to act as promoter to increase the ratio of acetone to butyl alcohol produced.

In testimony whereof I have signed my name to this specification.

HENRY BROUGHAM HUTCHINSON.